United States Patent [19]

Toyonaga et al.

[11] Patent Number: 4,886,155
[45] Date of Patent: Dec. 12, 1989

[54] 90 DEGREES TURNING DEVICE WITH MEANS FOR CONSTANT ANGULAR VELOCITY

[75] Inventors: Keiji Toyonaga, Okazaki; Ichiro Ueno, Kashihara, both of Japan

[73] Assignees: Toyota Jidosha Kabushiki Kaisha; Tsubakimoto Chain Co., both of Japan

[21] Appl. No.: 230,087

[22] Filed: Aug. 9, 1988

[30] Foreign Application Priority Data

Aug. 11, 1987 [JP] Japan .......................... 62-123020[U]

[51] Int. Cl.⁴ .......................................... B65G 47/24
[52] U.S. Cl. .................................... 198/377; 198/411
[58] Field of Search ............... 198/375, 377, 410, 411, 198/412, 413, 465.1, 465.2, 803.01

[56] References Cited

U.S. PATENT DOCUMENTS

| | | | |
|---|---|---|---|
| 2,830,462 | 4/1958 | Vettese | 198/377 X |
| 2,928,222 | 3/1960 | Lindstaedt | 198/377 X |
| 2,952,351 | 9/1960 | Stone | 198/377 |
| 3,097,733 | 7/1963 | Frydryk | 198/377 |
| 3,269,516 | 8/1966 | Lucas | 198/377 |
| 4,483,526 | 11/1984 | Balka et al. | 198/377 X |
| 4,579,517 | 4/1986 | Biggs | 198/377 X |
| 4,667,621 | 5/1987 | Kusunoki et al. | |

FOREIGN PATENT DOCUMENTS

| | | |
|---|---|---|
| 57-61051 | 12/1982 | Japan . |
| 59-44567 | 3/1984 | Japan . |
| 59-69312 | 4/1984 | Japan . |
| 60-36928 | 3/1985 | Japan . |

Primary Examiner—Robert J. Spar
Assistant Examiner—Lyle Kimms
Attorney, Agent, or Firm—Finnegan, Henderson, Farabow, Garrett & Dunner

[57] ABSTRACT

A turning device including a moving member movable along a linear path, and a turning member which is pivotable through an angle of 90 degrees about an axis perpendicular to the linear path during movement of the turning member along the linear path. A first and a second cam follower are provided on respective first and second surfaces of the turning member. A first cam provided on the second surface of the turning member has a first straight cam surface inclined to the linear path and engageable with the first cam follower, while a second cam spaced apart from the first cam in a direction parallel to the axis of of the turning member has a second straight cam surface engageable with the second cam follower. The second cam surface is inclined to the linear path such that the second cam follower is moved perpendicularly to the linear path in the same direction as the first cam follower as the moving member is moved. The first and second cams are positioned such that an engaging action between the second cam follower and the second cam surface is initiated when an engaging action between the first cam follower and the first cam surface is terminated. Either the axis of rotation of the turning member of the first and second cam followers always lead the other, while the moving member is moved along the linear path.

13 Claims, 6 Drawing Sheets

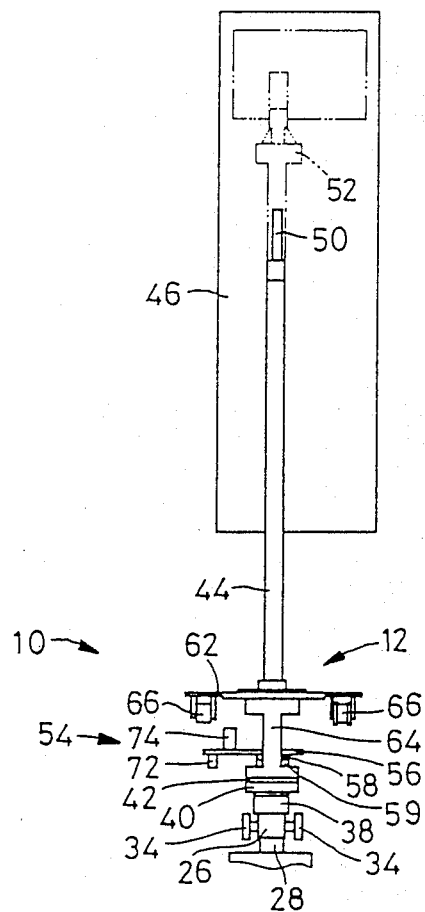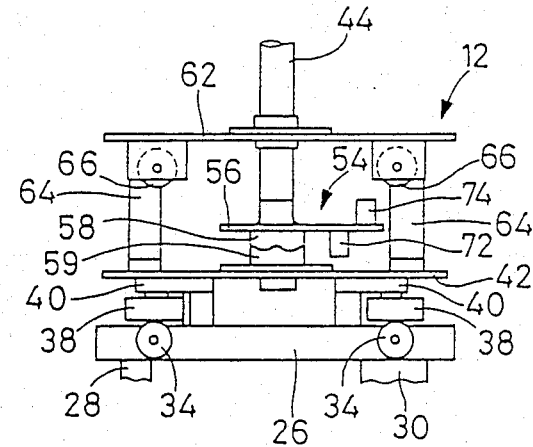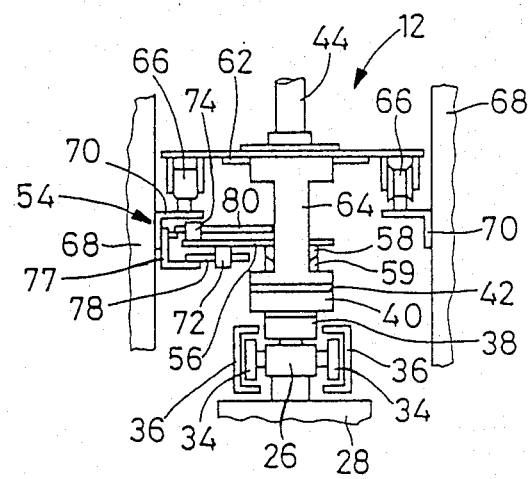

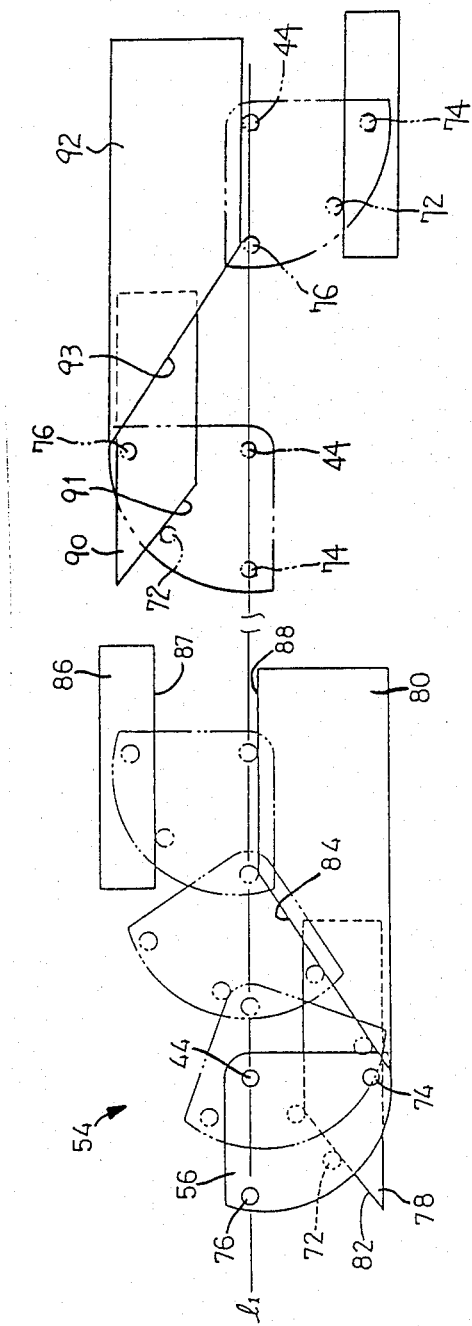

90 DEGREES TURNING DEVICE WITH MEANS FOR CONSTANT ANGULAR VELOCITY

BACKGROUND OF THE INVENTION

1. Field of the Invention

The present invention relates in general to a device for turning an object through 90 degrees, and more particularly to such a 90° turning device adapted to turn an object material or article while it is transferred by a conveyor or other type of transfer equipment.

2. Discussion of the Prior Art

An example of a device used for turning an article in the process of being transferred is disclosed in Publication No. 57-61051 (published Dec. 27, 1982) of examined Japanese Utility Model Application, wherein a rotary plate is rotatably mounted on a moving member which is movable along a linear path. The rotary plate is provided with a plurality of cam follower rollers, which are adapted to sequentially engage recesses or cutouts formed in a fixed cam plate, so that the rotary plate is rotated while it is moved along the linear path. Another known turning device uses a rack-and-pinion arrangement. These known turning devices are comparatively complicated in construction and suffer from a relatively high cost of manufacture.

In view of the conventional turning devices described above, the assignee of the present application developed a 90° turning device 100 as shown in FIG. 11. This turning device 100 uses simple cams having straight surfaces, and a cam follower engageable with the cam surface. Described more specifically, the 90° turning device 100 uses an elongate turning member 102 which is supported rotatably about the axis of a shaft 114. The turning member 102 has a cam follower 104 at one of its opposite ends. The cam follower 104 is engageable with a first cam surface 108 of a first cam 106, and a second cam surface 112 of a second cam 110, while the turning member 102 is moved along a linear path. With the cam follower 104 engaging the first and second cam surfaces 108, 112, the turning member 102 is turned about the shaft 114.

When an article being transferred is turned to change its posture by a turning device, it is desirable that the article is turned at a constant angular velocity. A change in the angular velocity of the turning device means a certain degree of acceleration, which may cause the article to slide or otherwise move out of position on the turning device or even fall from the turning device. A curve indicated in FIG. 9 is a path or locus described by a point P on a circle when a straight line OP between a center O of the circle and the point P on the circumference of the circle is rotated about the center O, while the center O is moved along a straight path OA. The curved path is an ideal path that is to be taken by the cam follower 104 to cause the turning member 102 to be rotated at a constant angular velocity, where the centerline or axis of rotation of the shaft 114 of the turning member 102 lies on the center O of the circle while the center of the cam follower 104 lies on the point P. The ideal curved path to be taken by the cam follower 104 is also indicated in FIG. 10 in two-dot chain line. The turning member 102 can be rotated at a substantially constant angular velocity, if the angles of inclination of the first and second cam surfaces 108, 112 are determined so as to approximate to that of the ideal curved path. The cam surfaces 108, 112 of the turning device 100 of FIG. 11 are adapted to substantially follow intermediate portions of the ideal curved path.

Since the cam surfaces 108, 112 are straight, it is impossible to guide the cam follower 104 smoothly along a central portion of the ideal curved path at which the path is turned or bent. The straight cam surfaces 108, 112 cannot faithfully follow the turned central portion of the curved path. In other words, the cam follower 104 cannot be adequately guided after the cam follower 104 leaves the first cam surface 108 and before it comes into contact with the second cam surface 112. Accordingly, the turning velocity of the turning member 102 is suddenly increased upon abutting contact of the cam follower 104 on the second cam surface 112, whereby the turning member 102 undergoes a high degree of acceleration, which may cause the above-indicated inconvenience in turning the object article mounted on the turning device.

SUMMARY OF THE INVENTION

It is therefore an object of the present invention to provide a 90° turning device which is simple in construction and economical to manufacture, and which is capable of turning an object at a substantially constant angular velocity.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

The above objects may be achieved according to the principles of the present invention, as embodied and broadly described herein, which provide a 90° turning device including a moving member which is moved along a linear path, and a turning member which is pivoted through an angle of 90 degrees about an axis of rotation perpendicular to the linear path, as the moving member is moved along the linear path, the turning device comprising: a first cam follower provided on one of opposite surfaces of the turning member; a second cam follower provided on the other of the opposite surfaces of the turning member; a first cam having a first straight cam surface which is inclined with respect to the linear path and which is engageable with the first cam follower; and a second cam spaced apart from the first cam in a direction parallel to the axis of rotation of the turning member. The second cam has a second straight cam surface which is engageable with the second cam follower, and the second straight cam surface is inclined with respect to the linear path, such that the second cam follower is moved perpendicularly to the linear path in the same direction as the first cam follower as the moving member is moved along the linear path. The first and second cams are positioned such that an engaging action between the second cam follower and the second straight cam surface is initiated when an engaging action between the first cam follower and the first straight cam surface is terminated. One of the axis of rotation of the turning member and the first and second cam followers lead the other of the axis of rotation of the turning member and the cam followers, while the moving member is moved along the linear path.

In the 90° turning device of the present invention constructed as described above, the first and second straight cam surfaces indicated at A and B in FIG. 7 can substantially follow terminal portions of the curved path of the cam followers which is ideal to enable the turning member to be pivoted at a constant angular velocity. Since the terminal portions of the ideal curved path are comparatively straight, i.e., not so heavily curved as the intermediate portions (including the turned portion) which the cam surfaces 108, 112 of the turning device 100 of FIG. 11 are adapted to follow, the first and second straight cam surfaces are sufficient to smoothly guide the first and second cam followers substantially along the ideal curved path of FIG. 9, such that the first cam follower initially engages the first straight cam surface A and then the second cam follower engages the second straight cam surface B. Accordingly, the instant turning device is capable of being turned or pivoted at a substantially constant angular velocity.

If the instant turning device is used for turning an object while it is transferred in a part transfer line such as a conveyor system, the constant angular velocity of the turning device prevents otherwise possible displacement of the object or falling of the object from the turning device due to a sudden change in the turning speed at a point corresponding to the turning portion of the ideal curved path. Further, the use of the simple cams having the straight cam surfaces contributes to easy manufacture of the turning device at a reduced cost.

In one form of the present invention, the first and second cam followers have a cylindrical shape, and are positioned such that centerlines thereof are parallel to the axis of rotation of the turning member, and such that extensions of the centerlines pass respective two points which lie on an arc which has a center on the axis of rotation.

In another form of the invention, the turning device further comprises a third cam follower, a third cam and a fourth cam. The third cam follower is provided on the other of the opposite surfaces of the turning member on which the second cam follower is provided. The second and third cam followers are spaced apart from each other through an angle of 90 degrees in a circumferential direction about the axis of rotation of the turning member. The first cam follower is spaced apart from the second and third cam followers through an angle of 45 degrees in the circumferential direction. The third and fourth cams have third and fourth straight cam surfaces which are formed symmetrically with the first and second straight cam surfaces of the first and second cams, respectively, with respect to the linear path. The third and fourth cams are positioned in spaced-apart relation with the first and second cams in a direction of movement of the moving member along the linear path. The first and third cam followers are engageable with the third and fourth straight cam surfaces when the moving member is further moved after the turning member has been pivoted through 90 degrees in a first direction with the first and second cam followers engaging the first and second straight cam surfaces, whereby the turning member is pivoted through an angle of 90 degrees in a second direction opposite to the first direction.

In a further form of the invention, the turning member consists of a sectorial planar member in the form of a sector. In this case, the axis of rotation of the turning member lies on a center of the sector.

In a still further form of the invention, the turning device further comprises a first stop surface and a second stop surface. The first stop surface is provided on the second cam such that the first stop surface extends parallel to the linear path, from an end of the the second straight cam surface. The second stop surface is provided on a stop member such that the second stop surface extends parallel to the linear path. The second stop surface is engageable with the first cam follower to inhibit a pivotal movement of the turning member in a first direction caused by the second straight cam surface while permitting a linear movement of the turning member along the linear path. The first stop surface is engageable with the second cam follower to inhibit a pivotal movement of the turning member in a second direction opposite to the first direction while permitting the linear movement of the turning member. Thus, the turning member is moved along the linear path while the pivotal movements thereof in the first and second directions are inhibited by the first and second stop surfaces.

In a yet further form of the invention, the turning device further comprises a first coupling member rotated with the turning member, a stationary second coupling member which meshes with the first coupling member, and biasing means for biasing the first and second coupling members toward each other. The first and second coupling members have coupling surfaces which are formed such that the first and second coupling members are closest to each other in the direction parallel to the axis of rotation of the turning member at a first and a second 90°-spaced-apart relative angular phase and such that the first and second coupling members are movable initially away from each other and then toward each other when the first coupling member is rotated relative to the second coupling member from one of the first and second 90°-space-apart relative angular phases.

In another form of the invention, the turning device further comprises a post fixed to the turning member such that the post extends along the axis of rotation of the turning member. The post has a support base at its upper end, for supporting thereon an object which is to be rotated through 90 degrees.

The moving member may comprise a carrier which is supported by guide means in a longitudinal direction of the guide means. The guide means may consist of a first pair of parallel rails which are spaced apart from each other in a direction of width of the carrier, and a second pair of parallel rails which are spaced apart from each other in the direction of width of the carrier, by a larger distance than the first pair of rails. The second pair of parallel rails extend over a portion of a length of the first pair of parallel rails. The carrier has wheels which are engageable with the second pair of parallel rails to support the carrier. The carrier may be connected to a chain of a chain conveyor and is moved with the chain.

Where a plurality of carriers identical with the carrier described above are incorporated in a conveyor line, such that the carriers are supported by the guide rails, each of the carriers is connected to the chain by engagement between a pivotable hook provided on one of the each carrier and the chain, and a tractor member provided on the other of the each carrier and the chain. Each carrier includes engagement release means which acts on the pivotable hook of the following carrier when the following carrier approaches the relevant carrier by a distance shorter than a predetermined value, and thereby releasing the engagement between the pivotable hook and the tractor member of the following carrier.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which:

FIG. 2 is a side elevational view of the conveyor system of FIG. 1;

FIG. 3 is a fragmentary front elevational view of the conveyor system of FIG. 1;

FIG. 4 is a fragmentary side elevational view of the conveyor system of FIG. 1;

FIG. 5 is a schematic plan view of the turning device;

DETAILED DESCRIPTION OF THE PREFERRED EMBODIMENTS

By reference to the accompanying drawings, there will be described the preferred embodiments of the 90° turning device of the present invention, as incorporated in a conveyor system adapted to perform a painting operation on a vehicle bumper during transfer of the bumper by the conveyor system.

Figure 1:
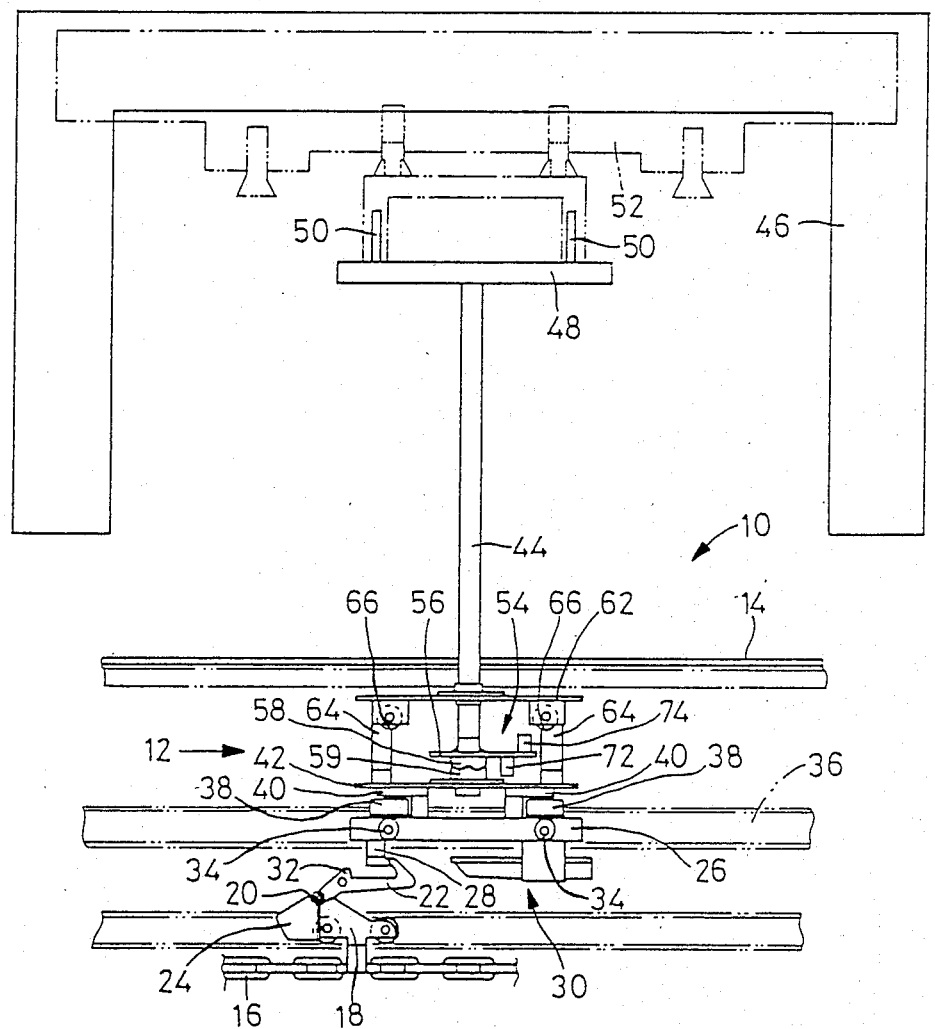
FIG. 1 is a front elevational view of one embodiment of a 90° turning device of the present invention incorporated in a bumper conveyor system.

Referring first to FIG. 1, the bumper conveyor system is generally indicated at 10. The conveyor system 10 incorporates a multiplicity of carriers 12, one of which is shown in the figure. The carrier 12 is disposed below a working floor 14, and is moved along a linear path by a chain conveyor 16 of the conveyor system 10. The chain conveyor 16 has a bracket 18 bolted thereto. The bracket 18 has a pivotable tractor hook 22 attached thereto by a shaft 20 such that the hook 22 is pivotable about the shaft 20. The tractor hook 22 includes a weight 24, by which the hook 22 is normally placed in its operated position of FIG. 1, in which the hook 22 engages a tractor bar 28 which extends downwardly from a body 26 of the carrier 12.

Below the body 26 of the carrier 12, there is provided an engagement release mechanism 30 which is adapted to act on the tractor hook 22 of the following carrier 12 if the following carrier approaches the instant carrier by a distance shorter than a predetermined value, for example, while the instant carrier 12 is stopped. Described more specifically, the tractor hook 22 of each carrier 12 has an arm 32 which is abuttable on the rear end of the engagement release mechanism 30 of the preceding carrier 12, so that the tractor hook 22 is pivoted by the engagement release mechanism 30, about the shaft 20, in the direction that causes the tractor hook 22 to be disengaged from the tractor bar 28, whereby the carrier 12 having the pivoted tractor hook 22 is disconnected from the conveyor chain 16 and stopped, for avoiding an interference between the two adjacent carriers 12, 12.

The body 26 of each carrier 12 is provided with two pairs of carrier rollers 34, which pairs are spaced apart from each other in the direction of movement of the carrier 12. The carrier rollers 34 are supported rotatably about horizontal axes, and are guided by a pair of guide rails 36 of channel steel, in rolling engagement therewith. The carrier 12 further has a pair of guide rollers 38 which are rotatable about vertical axes between the pair of guide rails 36. More particularly, the carrier 12 has a pair of brackets 40 which are secured to the body 26. The guide rollers 38 are supported rotatably by the respective brackets 40. On the two brackets 40, there is fixed a plate 42 having a central portion from which a post 44 extends upwardly.

The post 44 extends above the working floor 14, through a groove formed in the floor 14. The post 44 has a support base 48 fixed at its upper end, for supporting a bumper 46. The support base 48 is provided at its opposite end portions with two support bars 50, which are adapted to engage fitting holes provided on a fixture 52. The bumper 46 is mounted on the fixture 52, which is positioned with respect to the support base 48.

Referring further to FIGS. 2-4, there are disposed a turning member 56 and a first coupling member 58 of a 90° turning device 54 (which will be described in detail), which are secured to a lower end portion of the post 44. The first coupling member 58 has a curved coupling or engaging surface which meshes with a similarly formed surface of a second coupling member 59. This second coupling member 59 is secured to the plate 42. The lower end portion of the post 44 slidably extends through the second coupling member 59 and the plate 42. Therefore, the first coupling member 58 and the turning member 56 are rotated as a unit, whereby the bumper 46 on the support base 48 of the post 44 is rotated with the first coupling member 58 and the turning member 56. In the present embodiment, the carrier 12 constitutes a moving member on which is rotatably supported the turning member 56 rotatably about the axis of the post 44.

The first and second coupling members 58, 59 are normally held in one of two fully engaged positions, due to the weight of a mass which includes the first coupling member 58, turning member 56, post 44, fixture 52 and the bumper 46. In the fully engaged position, the first and second coupling members 58, 59 are closest to each other in the direction parallel to the axis of the post 44. The curved coupling surfaces of the first and second coupling members 58, 59 are formed so that the first coupling member 58 is first moved upwardly away from the second coupling member 59, and then moved downwardly toward the second coupling member 59 when the first coupling member 58 is rotated with the post 44 relative to the second coupling member 59, from one of the fully engaged positions to another. Namely, the two coupling members 58, 59 have two 90°-spaced-apart relative angular phases.

The post 44 is also slidably supported by a bearing plate 62, which in turn is supported by two support members 64 which extend from the opposite ends of the plate 42. The bearing plate 62 has two pairs of wheels 66 positioned on opposite sides of the support members 64.

As indicated in FIG. 4, the wheels 66 roll on a pair of guide rails 70 attached to respective frames 68 which are provided on opposite sides of a linear path of the carrier 12. The wheels 66 have a larger tread than the carrier rollers 34, and consequently enable the carrier 12 to run with increased stability, preventing a swinging or rattling movement of the bumper 46. The guide rails 70 are provided over a portion of the linear path of the carrier 12, in which the painting operation is conducted on the bumper 46. Thus, the wheels 66 assure stable running of the carrier 12 and thereby permit the painting operation, without the swinging or rattling movement of the bumper 46. While the carrier 12 is travelling with the wheels 66 rolling on the guide rails 70, the carrier rollers 34 are held away from the guide rails 36.

Figure 6:
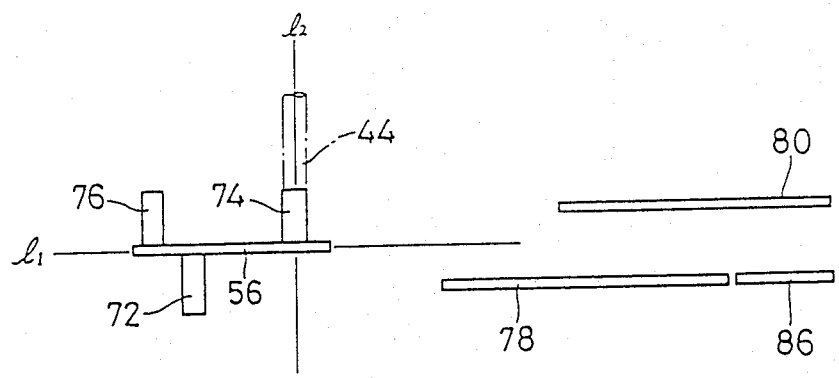
FIG. 6 is a a schematic front elevational view of the turning device.

As shown in FIGS. 5 and 6, the turning member 56 of the 90° of turning device (hereinafter simply referred to as "turning member 56") is a planar member in the form of a sector as seen in the plan view of FIG. 5. The turning member 56 has a first cam follower in the form of a pin 72 formed on one of opposite major surfaces thereof which is remote from the working floor 14. The turning member 56 further has a second and a third cam follower in the form of pins 74, 76 formed on the other major surface on the side of the working floor 14. These two pins 74, 76 are positioned on the opposite ends of the arc of the sector of the sectorial turning member 56. Namely, the pins 74, 76 are spaced apart from each other by an angle of 90 degrees in the circumferential direction of the sector about the axis of the post 44. The pin 72 is located at an intermediate position between the pins 74, 76, that is, spaced apart from these pins 74, 76 by an angle of 45 degrees in the circumferential direction of the turning member 56.

One of the guide rails 70 is provided with a bracket 77, at a position in which the bumper 46 is subjected to the painting operation. To this bracket 77, there are attached a first cam 78 and a second cam 80, as shown in FIG. 4. The first cam 78 has a first cam surface 82 which is engageable with the first cam follower pin 72, while the second cam 80 has a second cam surface 84 which is engageable with the second cam follower pin 74. The first cam surface 82 is a straight slope which is inclined such that the slope approaches the linear path 11 (FIG. 5) of the post 44 (chain conveyor 16), as the slope extends in the direction of movement of the post 44 along the linear path. Similarly, the second cam surface 84 is a straight slope which is inclined such that the slope approaches the linear path 11 as it extends in the direction of movement of the post 44. As indicated in FIG. 6, the first and second cams 78, 80 are spaced apart from each other in a direction parallel to the axis of rotation 12 of the post 44 (pivot axis of the turning member 56). As the turning member 56 (post 44) is moved along the linear path, the first cam follower pin 72 first comes into contact with the first cam surface 82 of the first cam 78, as indicated in FIG. 5.

As the post 44 is moved along the linear path 11 with the pin 72 held in contact with the first cam surface 82, the turning member 56 is pivoted in the clockwise direction, as indicated in dashed line in FIG. 5. When the post 44 (turning member 56) has reached a position in which the second cam follower pin 74 comes into contact with the second cam surface 84 of the second cam 80, the first cam follower pin 72 is disengaged from the first cam surface 82. With a further movement of the post 44, the turning member 56 is further pivoted in the clockwise direction, through the engagement of the pin 74 with the second cam surface 84. In the process of pivotal movement of the turning member 56, the post 44 always leads the pins 72, 74, 76. When the second cam follower pin 74 reaches the end of the second cam surface 84, that is, when the turning member 56 has been rotated through 90 degrees, and the first cam follower pin 72 contacts a stop surface 87 of a stop 86 which is attached to the side surface of the guide rail 70 remote from the cams 78, 80. Consequently, a further pivotal movement of the turning member 56 in the clockwise direction is inhibited.

On the other hand, a pivotal movement of the turning member 56 in the counterclockwise direction is prevented by engagement of the second cam follower pin 74 with a stop surface 88 formed on the second cam 80. Since the stop surfaces 87, 88 are formed so as to extend parallel to the linear path of the post 44, the turning member 56 is permitted to move along the linear path, while its pivotal movements in the clockwise and counterclockwise directions are inhibited.

Figure 7:
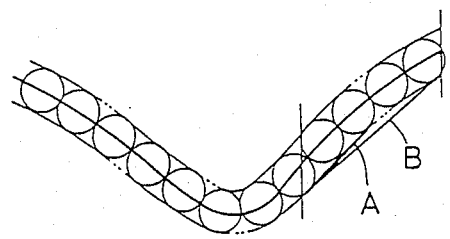
FIG. 7 is an illustration indicating a relationship between cam surfaces and an ideal path of cam followers according to the principle of the invention.

The angles of inclination of the first and second cam surfaces 82, 84 are indicated by straight lines A and B in FIG. 7, which almost follow terminal portions of an ideal curved path of the cam followers indicated in two-dot chain line in the same figure. These terminal portions of the ideal curved path are most straight portions of all the portions of the curved path. Accordingly, the use of the straight cam surfaces 82, 84 allows sufficient approximation of the actually produced path of the cam followers 72, 74 with the ideal curved path as indicated in FIG. 7, which enables the turning member 56 to be pivoted at a constant angular velocity. In the instant turning device 54, the engagement of the two pins 72, 74 with the respective two cam surfaces 82, 84 during a movement of the turning member 56 permits the pins 72, 74 (cam followers) to move almost following the ideal path, and thereby prevents the turning member 56 (pins 72, 74) from being accelerated half way through the 90° pivotal movement.

As shown in FIG. 5, a third cam 90 and a fourth cam 92 are disposed in spaced-apart relation with the first and second cams 78, 80 in the direction of movement of the turning member 56. The third and fourth cams 90, 92 are attached to the side surface of the guide rail 70 to which the stop 86 is attached. These cams 90, 92 are disposed on the side of the linear path 11 opposite to the first and second cams 78, 80. The cams 90, 92 have a third and a fourth straight cam surface 91, 93 which are inclined symmetrically with the first and second straight cam surfaces 82, 84, with respect to the linear path of the post 44. After the turning member 56 leaves the stop surfaces 87, 88, the first cam follower pin 72 contacts the third cam surface 91, and then the third cam follower pin 76 contacts the fourth cam surface 93, whereby the turning member 56 is pivoted through 90 degrees in the counterclockwise direction. Thus, the turning member 56 is restored to the original position.

As the turning member 56 of the turning device 54 is pivoted during its linear movement by the chain conveyor 16, the bumper 46 supported on the post 44 moves as described below.

When the carrier 12 is moved by the chain conveyor 16 to a position in which the painting operation is effected on the bumper 46, the carrier rollers 34 are disengaged from the guide rails 36, and the wheels 66 start to roll on the guide rails 70, whereby the bumper 46 is conveyed while being accurately positioned such that the length of the bumper 46 is perpendicular to the direction of its linear movement (to the direction of movement of the post 44). In this condition, the end faces of the bumper 46 are painted by two painting devices disposed on the opposite sides of the bumper conveyor 10. After completion of the painting of the end faces of the bumper 46, the first cam follower pin 72 comes into engagement with the first cam surface 82, and a clockwise pivotal movement of the turning member 56 is initiated. The first coupling member 58 which is fixed to the turning member 56 and which is normally fully engaged with the second coupling member 59 is moved upward with the post 44, as the turning member 56 is pivoted clockwise. Namely, the curved coupling surface of the first coupling member 58 slides on the mating curved coupling surface of the second coupling member 59, with a torque applied to the turning member 56. As described above, the turning member 56 is pivoted through 90 degrees about the post 44, when the second cam follower pin 74 reaches the upper end of the second cam surface 84 of the second cam 80, whereby the bumper 46 on the post 44 is pivoted through 90 degrees so that the length of the bumper 46 extends parallel to the direction of movement of the carrier 12. Since the bumper 46 is pivoted at a substantially constant angular velocity, the bumper 46 will neither move on the fixture 52 nor fall from the fixture 52, during the 90° pivotal movement. After this pivotal movement of the bumper 46, longitudinal surfaces of the bumper 46 are painted by the painting devices.

Figure 8:
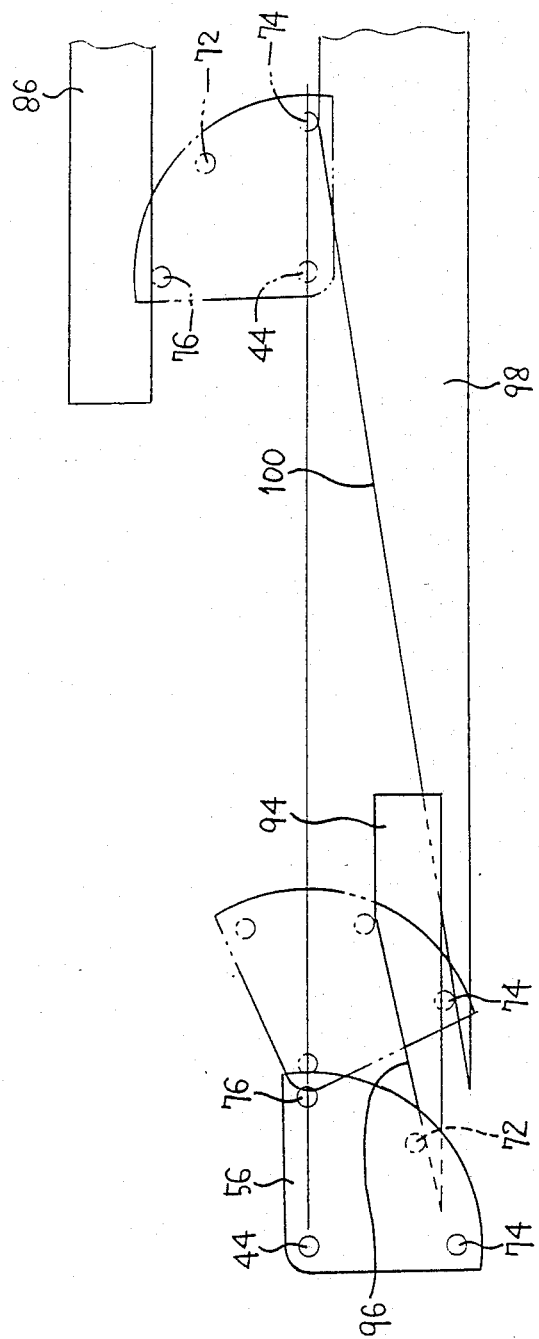
FIG. 8 is a schematic plan view of another embodiment of the turning device of the invention.
Figure 9:
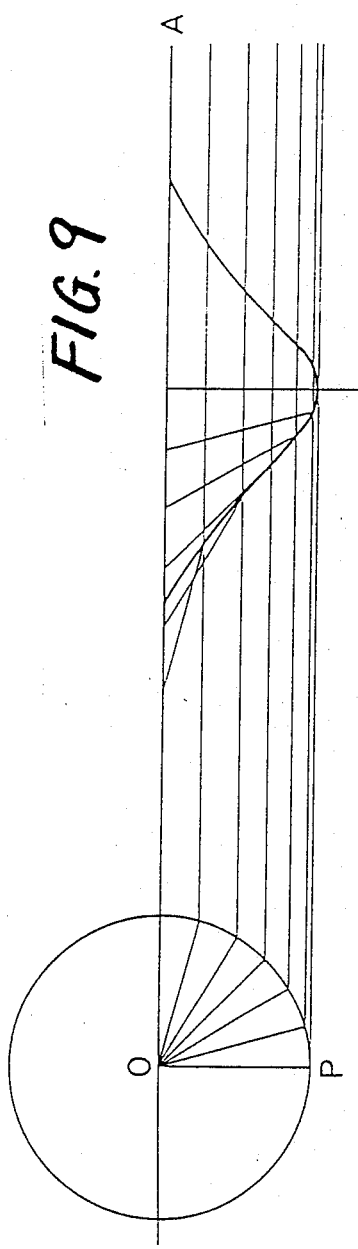
FIG. 9 is a graphical representation illustrating an ideal path of a cam follower of a turning member, which enables the turning member to be turned at a constant angular velocity.
Figure 11:
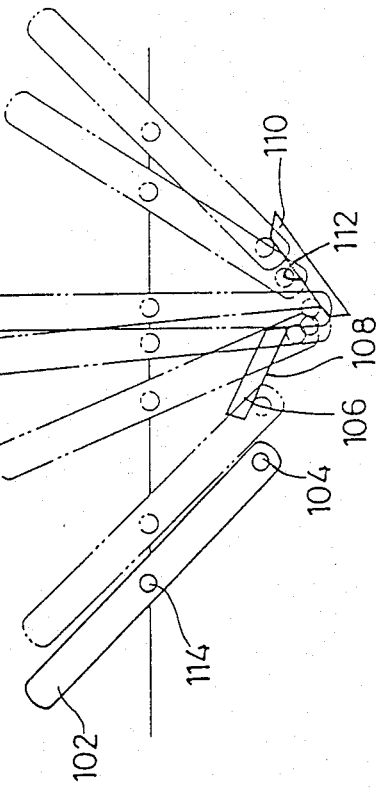
FIG. 11 is a plan view showing an arrangement of the known turning device.
Figure 10:
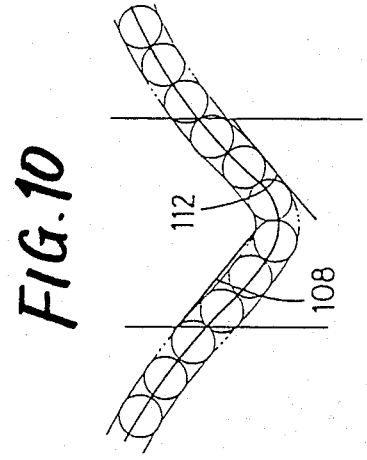
FIG. 10 is a illustrating indicating a relationship between cam surfaces and an ideal path of a cam follower of a turning device developed by the assignee of the present application.

Referring to FIG. 8, a modified embodiment of the present invention will be described. In the preceding embodiment, the turning member 56 is pivoted through 90 degrees while the turning member 56 is moved along the linear path such that the post 44 leads the first, second and third cam followers in the form of the pins 72, 74, 76, as shown in FIG. 5. However, it is possible that the turning member 56 is moved such that the cam followers 72, 74, 76 lead the post 44, as indicated in FIG. 8. In this case, a first cam 94 has a first cam surface 96 engageable with the first cam follower 72, and a second cam 98 has a second cam surface 100 engageable with the second cam follower 74. The first and second cam surfaces 96, 100 are inclined such that the second cam follower 74 comes into engagement with the second cam surface 100 when the first cam follower 72 reaches the end of the first cam surface 96, and so that the turning member 56 is rotated through 90 degrees when the second cam follower 74 reaches the end of the second cam surface 100. In this case, it is desirable that the cam followers 72, 74, 76 consist of suitable rollers rotatably supported on the turning members 56, in order to reduce frictional resistance between the cam followers and the cam surfaces 96, 100.

While the present invention has been described in its presently preferred embodiments as applied to the bumper conveyor 10, it is to be understood that the invention is not limited to the precise details of the illustrated embodiments, but may be embodied with various changes, modifications and improvements, which may occur to those skilled in the art, without departing from the spirit and scope of the invention defined in the following claims. For instance, the 90° turning device according to the invention is applicable to various types of equipment and apparatus, other than the bumper conveyor 10 of the illustrated embodiments. Although the pins 72, 74, 76 are used as the cam followers engageable with the cam surfaces, the pins 72, 74, 76 may be replaced by suitable rollers rotatably supported on the turning member 56.

What is claimed is:

1. A 90° turning device including a moving member which is moved along a linear path, and a turning member which is pivoted through an angle of 90 degrees about an axis of rotation perpendicular to said linear path, as said moving member is moved along said linear path, said turning device comprising:
   a first cam follower provided on one of opposite surfaces of said turning member;
   a second cam follower provided on the other of said opposite surfaces of said turning member;
   a first cam having a first straight cam surface which is inclined with respect to said linear path and which is engageable with said first cam follower;
   a second cam spaced apart from said first cam in a direction parallel to said axis of rotation of said turning member, said second cam having a second straight cam surface which is engageable with said second cam follower, said second straight cam surface being inclined with respect to said linear path, such that said second cam follower is moved perpendicularly to said linear path in the same direction as said first cam follower as said moving member is moved along said linear path;
   said first and second cams being positioned such that an engaging action between said second cam follower and said second straight cam surface is initiated when an engaging action between said first cam follower and said first straight cam surface is terminated, one of said axis of rotation of said turning member and said first and second cam followers leading the other of said axis of rotation and said cam followers, while said moving member is moved along said linear path.

2. A 90° turning device according to claim 1, wherein said first and second cam followers have a cylindrical shape, and are positioned such that centerlines thereof are parallel to said axis of rotation of said turning member, and such that extensions of said centerlines pass respective two points which lie on an arc which has a center on said axis of rotation.

3. A 90° turning device according to claim 1, further comprising:
   a third cam follower, a third cam and a fourth cam;
   said third cam follower being provided on said other of said opposite surfaces of said turning member such that said second and third cam followers are spaced apart from each other by an angle of 90 degrees in a circumferential direction about said axis of rotation of said turning member, said first cam follower being spaced apart from said second and third cam followers by an angle of 45 degrees in said circumferential direction; and
   said third and fourth cams having third and fourth straight cam surfaces which are symmetrical with said first and second straight cam surfaces of said first and second cams, respectively, with respect to said linear path, said third and fourth cams being positioned in spaced-apart relation with said first and second cams in a direction of movement of said moving member along said linear path, said first and third cam followers being engageable with said third and fourth straight cam surfaces when said moving member is further moved after said turning member has been pivoted through 90 degrees in a first direction with said first and second cam followers engaging said first and second straight cam surfaces, whereby said turning member is pivoted through an angle of 90 degrees in a second direction opposite to said first direction.

4. A 90° turning device according to claim 1, wherein said turning member consists of a sectorial planar member in the form of a sector, said axis of rotation perpendicularly intersecting said sector, at a center thereof.

5. A 90° turning device according to claim 1, further comprising:

a first stop surface and a second stop surface;

said first stop surface being provided on said second cam such that said first stop surface extends parallel to said linear path, from an end of said said second straight cam surface;

said second stop surface being provided on a stop member such that said second stop surface extends parallel to said linear path;

said second stop surface being engageable with said first cam follower to inhibit a pivotal movement of said turning member in a first direction caused by said second straight cam surface while permitting a linear movement of said turning member along said linear path;

said first stop surface being engageable with said second cam follower to inhibit a pivotal movement of said turning member in a second direction opposite to said first direction while permitting said linear movement of the turning member, whereby said turning member is moved along said linear path while the pivotal movements thereof in said first and second directions are inhibited by said first and second stop surfaces.

6. A 90° turning device according to claim 1, further comprising a first coupler rotated with said turning member, a stationary second coupler which meshes with said first coupler, and biasing means for biasing said first and second couplers toward each other, said first and seond couplers having coupling surfaces which are formed such that said first and second couplers are closest to each other in the direction parallel to said axis of rotation of said turning member at a first and a second 90°-spaced-apart relative angular phase and such that said first and second couplers are movable initially away from each other and then toward each other when said first coupler is rotated relative to said second coupler from one of said first and second 90°-space-apart relative angular phases.

7. A 90° turning device according to claim 1, further comprising a post fixed to said turning member such that said post extends along said axis of rotation, said post having at an upper end thereof a support base for supporting thereon an object which is to be rotated through 90 degrees.

8. A 90° turning device according to claim 1, wherein said moving member comprises a carrier which is supported by guide means, movably in a longitudinal direction of said guide means.

9. A 90° turning device according to claim 8, wherein said guide means consist of a first pair of parallel rails which are spaced apart from each other in a direction of width of said carrier, and a second pair of parallel rails which are spaced apart from each other in the direction of width of said carrier, by a larger distance than said first pair of rails, said second pair of parallel rails extending over a portion of a length of said first pair of parallel rails, said carrier having wheels which are engageable with said second pair of parallel rails to support said carrier.

10. A 90° turning device according to claim 8, wherein said carrier is connected to a chain of a chain conveyor and is moved with said chain.

11. A conveyor system including a 90° turning device as defined in claim 10, wherein a plurality of carriers identical with said carrier are supported by said guide rails, each of said plurality of carriers being connected to said chain by engagement between a pivotable hook provided on one of said each carrier and said chain, and a tractor member provided on the other of said each carrier and said chain, said each carrier including engagement release means for acting on the pivotable hook of the following carrier when said following carrier approaches said each carrier by a distance shorter than a predetermined value, and thereby releasing the engagement between said pivotable hook and said tractor member of said following carrier.

12. A 90° turning device according to claim 1 wherein said axis of rotation leads said first and second cam followers throughout the pivoting of said turning member through an angle of 90 degrees, as said moving member is moved along said linear path.

13. A 90° turning device according to claim 1 wherein said first and second cam followers lead said axis of rotation throughout the pivoting of said turning member through an angle of 90 degrees, as said moving member is moved along said linear path.

* * * * *